US 10,803,478 B2

(12) United States Patent
Badros et al.

(10) Patent No.: US 10,803,478 B2
(45) Date of Patent: Oct. 13, 2020

(54) PROVIDING SOCIAL ENDORSEMENTS WITH ONLINE ADVERTISING

(71) Applicant: Facebook, Inc., Menlo Park, CA (US)

(72) Inventors: Gregory Joseph Badros, Palo Alto, CA (US); Ami Vora, San Francisco, CA (US); David Benjamin Fischer, Los Altos, CA (US); Kent Schoen, San Francisco, CA (US); Timothy A. Kendall, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 585 days.

(21) Appl. No.: 14/818,304

(22) Filed: Aug. 5, 2015

(65) Prior Publication Data
US 2015/0339735 A1    Nov. 26, 2015

Related U.S. Application Data

(63) Continuation of application No. 12/898,662, filed on Oct. 5, 2010, now abandoned.

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0241* (2013.01); *G06Q 30/0277* (2013.01); *G06Q 50/01* (2013.01)

(58) Field of Classification Search
None
See application file for complete search history.

(56) References Cited

U.S. PATENT DOCUMENTS

| | | |
|---|---|---|
| 6,839,680 B1 | 1/2005 | Liu et al. |
| 2004/0193488 A1 | 9/2004 | Khoo et al. |

(Continued)

FOREIGN PATENT DOCUMENTS

| | | |
|---|---|---|
| CA | 2 676 963 A1 | 8/2008 |
| CA | 2740499 A1 | 11/2012 |

(Continued)

OTHER PUBLICATIONS

Australian Government, IP Australia, Examination report No. 1 for standard patent application, Australian Patent Application No. 2013209480, dated Jun. 8, 2017, three pages.

(Continued)

*Primary Examiner* — Michael W Schmucker
(74) *Attorney, Agent, or Firm* — Fenwick & West LLP

(57) ABSTRACT

Third-party publishers (such as websites) provide online advertisements combined with social endorsement information to users. A request for an advertisement is received from a viewing user via a third-party publisher system. A particular advertisement is selected in response to this request, and one or more advertisement tags associated with the advertisement are retrieved. The advertisement tags comprise information related to the advertisement. Social networking system data for users related to the viewing user is retrieved. Social endorsement information is obtained using the social networking system data and the advertisement tags associated with the advertisement. The social endorsement information and the advertisement are then combined and transmitted to the third-party publisher system, or are transmitted individually for combination by the third-party publisher system.

17 Claims, 10 Drawing Sheets

(56) References Cited

U.S. PATENT DOCUMENTS

| | | | |
|---|---|---|---|
| 2006/0004713 A1 | 1/2006 | Korte et al. | |
| 2006/0143068 A1 | 6/2006 | Calabria | |
| 2006/0200390 A1 | 9/2006 | Ananian | |
| 2006/0218111 A1* | 9/2006 | Cohen | G06F 17/30867 706/45 |
| 2007/0073583 A1 | 3/2007 | Grouf et al. | |
| 2007/0073584 A1 | 3/2007 | Grouf et al. | |
| 2007/0156524 A1 | 7/2007 | Grouf et al. | |
| 2007/0156525 A1 | 7/2007 | Grouf et al. | |
| 2007/0203887 A1 | 8/2007 | Dynin | |
| 2007/0244753 A1 | 10/2007 | Grouf et al. | |
| 2007/0260520 A1* | 11/2007 | Jha | G06Q 30/02 705/14.44 |
| 2008/0004942 A1 | 1/2008 | Calabria | |
| 2008/0040212 A1 | 2/2008 | Grouf et al. | |
| 2008/0052150 A1 | 2/2008 | Grouf et al. | |
| 2008/0082402 A1* | 4/2008 | Turrentine | G06Q 30/02 705/14.54 |
| 2008/0248815 A1 | 10/2008 | Busch | |
| 2008/0249834 A1 | 10/2008 | Zigmond et al. | |
| 2008/0250445 A1 | 10/2008 | Zigmond et al. | |
| 2008/0250446 A1 | 10/2008 | Zigmond et al. | |
| 2009/0006180 A1 | 1/2009 | Hameen-Anttila | |
| 2009/0017913 A1 | 1/2009 | Bell et al. | |
| 2009/0076912 A1 | 3/2009 | Rajan et al. | |
| 2009/0119167 A1 | 5/2009 | Kendall et al. | |
| 2009/0150198 A1 | 6/2009 | Volovich et al. | |
| 2009/0259552 A1* | 10/2009 | Chenard | G06Q 30/02 705/14.72 |
| 2010/0030578 A1 | 2/2010 | Siddique et al. | |
| 2010/0070485 A1 | 3/2010 | Parsons et al. | |
| 2010/0088719 A1 | 4/2010 | Hawkins et al. | |
| 2010/0094878 A1 | 4/2010 | Soroca et al. | |
| 2010/0131489 A1 | 5/2010 | Goldman-Shenhar et al. | |
| 2010/0145777 A1 | 6/2010 | Ghosh et al. | |
| 2010/0223119 A1 | 9/2010 | Klish | |
| 2010/0228582 A1 | 9/2010 | King et al. | |
| 2010/0228614 A1 | 9/2010 | Zhang et al. | |
| 2010/0235235 A1 | 9/2010 | Hosseini et al. | |
| 2010/0274815 A1 | 10/2010 | Vanasco | |
| 2010/0318466 A1 | 12/2010 | Flinchem et al. | |
| 2010/0332305 A1 | 12/2010 | Higgins et al. | |
| 2010/0332330 A1 | 12/2010 | Goel et al. | |
| 2011/0040648 A1 | 2/2011 | Steelberg et al. | |
| 2011/0047567 A1 | 2/2011 | Zigmond et al. | |
| 2011/0258042 A1* | 10/2011 | Purvy | G06Q 30/02 705/14.49 |
| 2011/0258050 A1* | 10/2011 | Chan | G06Q 30/02 705/14.66 |
| 2011/0296004 A1 | 12/2011 | Swahar | |
| 2011/0307399 A1 | 12/2011 | Holmes | |
| 2012/0030578 A1 | 2/2012 | Athsani et al. | |
| 2012/0084160 A1 | 4/2012 | Badros et al. | |
| 2012/0232998 A1 | 9/2012 | Schoen | |
| 2012/0284105 A1* | 11/2012 | Li | G06Q 30/02 705/14.23 |
| 2013/0124542 A1* | 5/2013 | Lee | G06F 17/30392 707/751 |
| 2013/0191207 A1 | 7/2013 | Smallwood et al. | |
| 2013/0191226 A1 | 7/2013 | Smallwood et al. | |

FOREIGN PATENT DOCUMENTS

| | | |
|---|---|---|
| CN | 101268483 A | 9/2008 |
| CN | 101802787 A | 8/2010 |
| CN | 101939745 A | 1/2011 |
| CN | 101960477 A | 1/2011 |
| EP | 2 210 185 | 7/2010 |
| JP | 2002-163548 A | 6/2002 |
| JP | 2003-044738 A | 2/2003 |
| JP | 2003-527627 A | 9/2003 |
| JP | 2008-158924 A | 7/2006 |
| JP | 2006-309660 | 11/2006 |
| JP | 2007-515018 A | 6/2007 |
| JP | 2007-183863 A | 7/2007 |
| JP | 2007-226598 A | 9/2007 |
| JP | 2009-521014 A | 5/2009 |
| JP | 2009-169606 A | 7/2009 |
| JP | 2009-217599 A | 9/2009 |
| JP | 2010-524352 A | 7/2010 |
| JP | 2011-503701 A | 1/2011 |
| JP | 2011-048765 A | 3/2011 |
| JP | 2011-253530 A | 12/2011 |
| JP | 2012-519915 A | 8/2012 |
| JP | 2012-532380 A | 12/2012 |
| KR | 10-2007-0038027 A | 4/2007 |
| KR | 10-2007-0100966 A | 10/2007 |
| KR | 10-2009-0001476 A | 1/2009 |
| KR | 10-2009-0112535 A | 10/2009 |
| KR | 10-2010-0077511 A | 7/2010 |
| KR | 10-2011-0017334 A | 2/2011 |
| WO | WO 2001/40920 A2 | 6/2001 |
| WO | WO 2005/065190 A2 | 7/2005 |
| WO | WO 2008/094930 A2 | 8/2008 |
| WO | WO 2009/061616 A1 | 5/2009 |
| WO | WO 2009/061617 A1 | 5/2009 |

OTHER PUBLICATIONS

Japan Patent Office, Office Action, Japanese Patent Application No. 2014-553479, dated Aug. 1, 2017, five pages.

Australian Government, IP Australia, Patent Examination Report No. 1, Australian Patent Application No. 2012225886, dated Jun. 10, 2016, two pages.

Canadian Intellectual Property Office, Office Action, Canadian Patent Application No. 2,813,722, dated Mar. 1, 2016, six pages.

Canadian Intellectual Property Office, Office Action, Canadian Patent Application No. 2,825,976, dated Mar. 15, 2016, three pages.

State Intellectual Property Office of the People's Republic of China, Second Office Action, Chinese Patent Application No. 2012800119166, dated May 4, 2016, seventeen pages.

Canadian Patent Office, Office Action for CA Application No. 2,857,966, dated May 2, 2017, 12 pages.

State Intellectual Property Office of the People's Republic of China, Decision of Rejection, Chinese Patent Application No. 201280011916.6, dated Mar. 3, 2017, fourteen pages.

Helft, M., "Google Aims to Make YouTube Profitable With Ads," Aug. 22, 2007, The New York Times, two pages. [Online] [Retrieved Dec. 14, 2016] Retrieved from the Internet <URL:http://www.nytimes/com/2007/08/22/technolog/22google.html.>.

Japan Patent Office, Office Action, Japanese Patent Application No. 2014-553479, dated Dec. 13, 2106, twenty-one pages.

Korean Intellectual Property Office, Office Action, Korean Patent Application No. 10-2013-7011222, dated Dec. 19, 2016, sixteen pages.

Australian Government, IP Australia, Patent Examination Report No. 2, Australian Patent Application No. 2012225886, dated Oct. 5, 2016, three pages.

Canadian Intellectual Property Office, Office Action, Canadian Patent Application No. 2,857,966, dated Jul. 21, 2016, five pages.

Mexican Institute of Industrial Property, Office Action, Mexican Patent Application No. MX/a/2013/010255, dated Aug. 17, 2016, ten pages [with summary in English].

State Intellectual Property Office of the People's Republic of China, Third Office Action, Chinese Patent Application No. 201280011916.6, dated Sep. 2, 2016, twenty-three pages.

PeopleMaps, 7 Degrees Unveils PeopleMaps New Social Business Application, Oct. 20, 2009, Associated Press, two pages.

State Intellectual Property Office of the People's Republic of China, Fourth Office Action, Chinese Patent Application No. 201280011916.6, dated Aug. 18, 2017, nine pages.

United States Office Action, U.S. Appl. No. 12/898,662, dated Sep. 14, 2017, eleven pages.

Australian Government, IP Australia, Patent Examination Report No. 1, Australian Patent Application No. 2011312803, dated Aug. 21, 2014, three pages.

Canadian Intellectual Property Office, Office Action, Canadian Patent Application No. 2,857,966, dated Oct. 20, 2015, seven pages.

(56) References Cited

OTHER PUBLICATIONS

Canadian Intellectual Property Office, Office Action, Canadian Patent Application No. 2,813,722, dated Feb. 26, 2015, five pages.
Canadian Intellectual Property Office, Office Action, Canadian Patent Application No. 2,825,976, dated Feb. 19, 2015, two pages.
Gibs, J. et al., "Advertising Effectiveness: Understanding the Value of a Social Media Impression," Apr. 2010, The Nielsen Company, twelve pages.
Japan Patent Office, Office Action, Japanese Patent Application No. 2013-557745, dated Jan. 19, 2015, seven pages.
Japan Patent Office, Office Action, Japanese Patent Application No. 2013-532803, dated Mar. 17, 2015, four pages.
Mexican Institute of Industrial Property, Office Action, Mexican Patent Application No. MX/a/2013/010255, dated Nov. 4, 2014, three pages [with concise explanation of relevance in English].
State Intellectual Property Office of the People's Republic of China, First Office Action, Chinese Patent Application No. 2012800119166, dated Dec. 9, 2015, nineteen pages.
Korean Intellectual Property Office, Office Action, Korean Patent Application No. 10-2013-7024209, dated Jan. 9, 2018, 80 pages.
Australian Government, IP Australia, Examination report No. 3 for standard patent application, Australian Patent Application No. 2013209480, dated Jun. 4, 2018, four pages.
United States Office Action, U.S. Appl. No. 12/898,662, dated Jul. 2, 2018, thirteen pages.
United States Patent and Trademark Office, Before the Patent Trial and Appeal Board, U.S. Appl. No. 13/354,849 and Appeal No. 2017-003912, Decision on Appeal, dated Jul. 5, 2018, ten pages.
Australian Government, IP Australia, Examination report No. 2 for standard patent application, dated Feb. 22, 2018, three pages.
United States Patent and Trademark Office, Office Action, U.S. Appl. No. 12/898,662, dated Feb. 27, 2018.
United States Patent and Trademark Office, Before the Patent Trial and Appeal Board, U.S. Appl. No. 13/354,785 and Appeal No. 2017-003908, Decision on Appeal, dated Aug. 1, 2018, eleven pages.
Canadian Intellectual Property Office, Office Action, Canadian Patent Application No. 2,813,722, dated Mar. 7, 2018, five pages.
Korean Intellectual Property Office, Office Action, Korean Patent Application No. 10-2018-7004839, dated Apr. 11, 2018, five pages.
Korean Intellectual Property Office, Office Action, Korean Patent Application No. 10-2014-7020007, dated Oct. 15, 2018, nineteen pages.
United States Patent and Trademark Office, Before the Patent Trial and Appeal Board, Examiner's Answer, U.S. Appl. No. 13/043,424, dated Nov. 2, 2018, ten pages.
The Brazilian National Institute of Industrial Property, Office Action, Brazilian Patent Application No. BR112013021622-0, dated Oct. 11, 2019, eight pages.
United States Office Action, U.S. Appl. No. 14/257,596, dated Mar. 27, 2020, 17 pages.

\* cited by examiner

PROVIDING SOCIAL ENDORSEMENTS WITH ONLINE ADVERTISING

CROSS REFERENCE TO RELATED APPLICATIONS

This application is a continuation of co-pending U.S. application Ser. No. 12/898,662, filed Oct. 5, 2010, which is incorporated by reference in its entirety.

BACKGROUND

This invention relates generally to online advertising, and in particular to providing social endorsement information in conjunction with an online advertisement.

Online advertising has evolved into a profitable business, allowing commercial and private entities alike to place advertisements on websites and within native applications, which are visible to viewing users who access these websites and applications. The ability to analyze data associated with a particular website, application and/or the viewing user has allowed advertisers to provide ads that are more relevant to a viewing user's interests. Relevant ads increase the likelihood of ad conversion (e.g., that the viewing user will observe the ad, click on the ad, proceed to the advertiser's website, or otherwise respond to the ad with the intended result) and/or the likelihood of greater demand for or awareness of the advertiser's goods or services, thereby raising the effectiveness of the ad.

Although ad targeting attempts to increase ad conversion by showing ads that are more relevant to the viewing user's interests, current methods of ad targeting lack a social context. When a person endorses a product to a friend, the friend is more likely to purchase or use the product. However, endorsements are currently limited to situations where the endorsing user must direct the endorsement to specific individuals, such as when a user expressly provides a friend's contact information. Current ad systems lack social information about ad viewers, so they cannot take advantage of these viewers' social connections, interests, or endorsements that are not expressly provided. Thus, there is a need for a comprehensive solution to providing social endorsement information in conjunction with online ads on third-party publisher systems in order to maximize ad relevancy and effectiveness.

SUMMARY

To address the needs of advertisers and third-party publishers to use social networking system data to provide socially relevant advertising to viewing users, embodiments of the invention retrieve an ad and social endorsement information to transmit to a third-party publisher system, where the social endorsement information is related to one or more ad tags. The ad tags may comprise information related to the ad, and may be provided by an advertiser, an ad server, or any other entity, or may be embedded within the ad itself. The ad tags specify, map to, or are otherwise associated with a content item, user information, a user action or any other activity or data within the social networking system. A social networking system provides data related to users associated with a viewing user, and social endorsement information is created by selecting social networking system data based on the ad tags, the social endorsement information indicating that one or more of the other users have taken an action within the context of the social networking system related to the ad, content item, user information, user action, or other data specified by the one or more advertisement tags. The social endorsement information and the ad are then either combined or are sent individually to the third-party publisher system.

Embodiments of the invention can provide advertisements with social endorsements using various different arrangements. In one embodiment, a social networking system acts as a proxy for communication between a third-party publisher website and an ad server. The third-party publisher website requests an ad from the social networking system, the social networking system forwards the request to an ad server, and the ad server transmits an ad to the social networking system for transmission with social endorsement information to the third-party publisher website. In an alternative embodiment, an ad server acts as a proxy for communication between a third-party publisher website and the social networking system. In this embodiment, the ad server receives the request for an ad, retrieves social endorsement information from the social networking system and transmits the ad and the social endorsement information to the third-party publisher website. In another embodiment, a third-party publisher website may request and receive a web-based ad from an ad server, and may separately request and receive social endorsement information from the social networking system. Alternatively, a third-party publisher website may instead request social networking system data from the social networking system and may create social endorsement information by selecting all or part of the social networking data. In another embodiment, an advertiser implants executable computer code into a web-based ad that when executed by a third-party publisher website or any other entity retrieves social endorsement information to be displayed in conjunction with the web-based ad. In another embodiment, a viewing user may request an ad through a software application, which in turn requests the ad from a social networking system or an ad server as discussed above.

Figure 1:
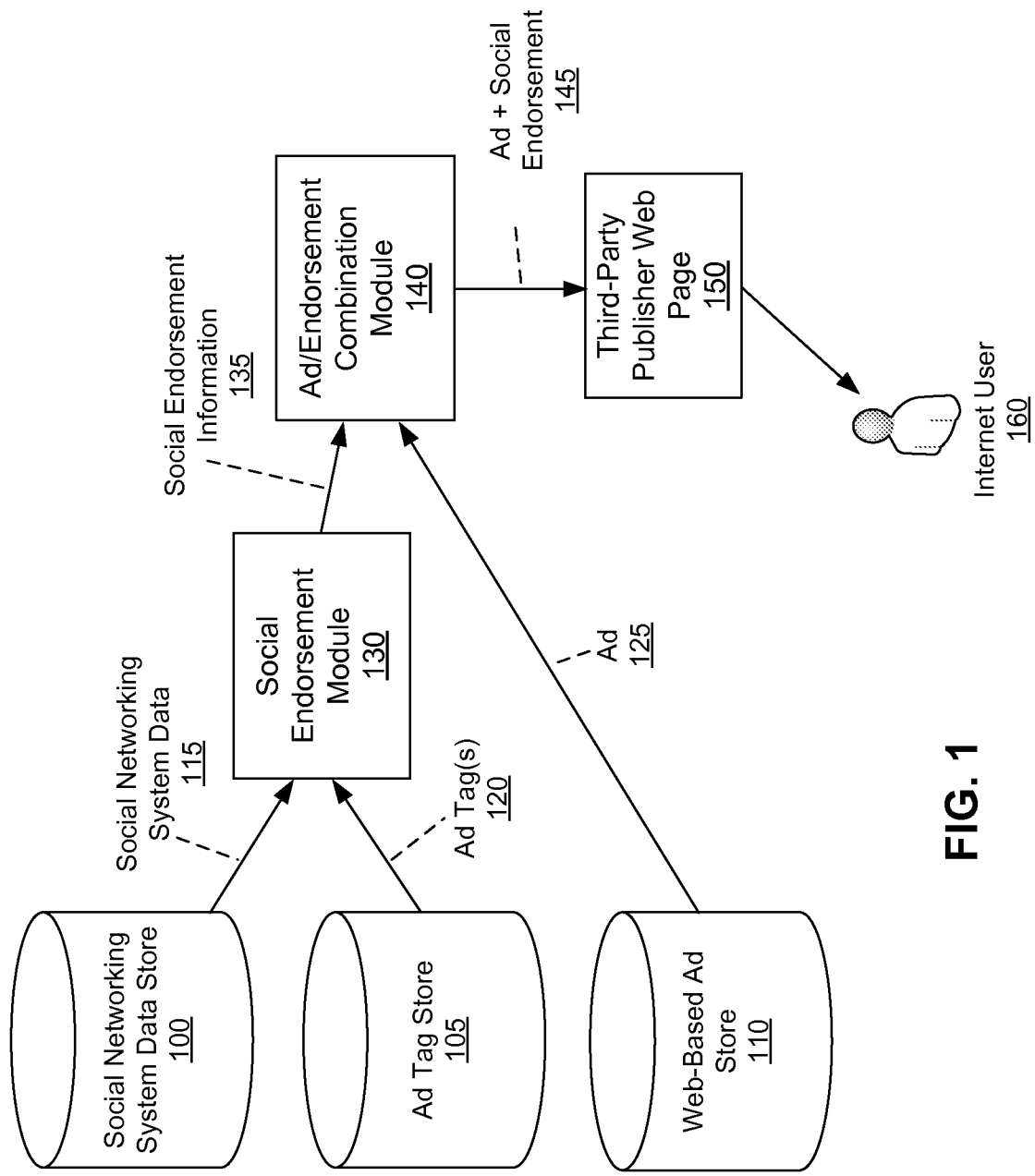
FIG. 1 is a diagram of the overall process for providing social endorsement information with web-based ads for third-party publisher websites, in accordance with an embodiment of the invention in which the ads are provided in a website.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Online social networking systems allow users to associate themselves and establish connections with other users of the social networking system. When two users become connected, they are said to be "friends," "contacts," "connections," or "associates" within the context of the social networking system. Generally being connected in a social networking system allows connected users access to more information about each other than would otherwise be available to unconnected users. Likewise, becoming connected within a social networking system may allow a user greater access to communicate with another user, such as by email (internal and external to the social networking system), instant message, text message, phone, or any other communicative interface. Finally, being connected may allow a user access to view, comment on, download or endorse another user's uploaded content items. Examples of content items include but are not limited to messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files.

Users of social networking systems may interact with content items, user information, user actions (for instance a communication made within the social networking system, or two users becoming friends), or any other activity or data within the social networking system. This interaction may take a variety of forms, such as by communicating with or commenting on the content item, information or action; clicking a button or link associated with approval (such as a "like" button); sharing a content item, user information or user actions with other users; downloading or merely viewing a content item; or by any other suitable means for interaction. Users of social networking systems may also interact with other users by associating, connecting or becoming friends with them, by viewing their profile, by communicating with them, or by having common friends within the social networking system. Further, a user of a social networking system may form or join groups, or may become a fan of a fan page. Finally, a social networking system user may interact with content items, websites, other users or other information outside of the context of the social networking system's web pages that are connected to or associated with the social networking system. For instance, an article on a news web site might have a "like" button that users of the social networking system can click on to express approval of the article. Likewise, a company's website may provide the ability to join a social networking system group dedicated to the company directly from the company's website. These interactions and any other suitable actions within the context of a social networking system may be recorded in social networking system data, which can be used to generate social endorsement information. The social endorsement information may comprise text, image, links, and/or any suitable form necessary to convey social endorsement information to a user.

Social endorsement information may be used to provide social context for advertisements that are shown to a particular viewing user. FIG. 1 is a diagram of an overall process for providing social endorsement information with web-based ads for third-party publisher websites, in accordance with an embodiment of the invention in which the ads are provided in a website. As illustrated, a web-based ad store 110 provides an ad 125 to the ad/endorsement combination module 140. The ad tag store 105 provides one or more ad tags 105 associated with the ad 125 to the social endorsement module 130. The ad tags specify, map to, or are otherwise associated with a content item, user information, a user action or any other activity or data within the social networking system. The social networking system data store 100 also provides social networking system data 115 to the social endorsement module 130. The social networking system data 115 may be data related to social networking system users associated with an Internet user 160. The social endorsement module 130 selects all or part of the social networking system data 115 based on the one or more ad tags 120 to create social endorsement information 135, which is provided to the ad/endorsement combination module 140. The ad/endorsement combination module 140 transmits the ad and the social endorsement 145 to a third-party web page 150, which is displayed to the Internet user 160.

In one example, an ad 125 may advertise a specific brand of basketball shoes. Examples of associated ad tags 120 may be the words "basketball", "shoes", "athlete", the names of professional basketball players, the URL of a social networking system fan page devoted to basketball, the URL of a social networking group web page administrated by the company who makes the specific brand of basketball shoes, an index code identifying the particular ad 125, the title of a movie that was popular among a targeted demographic, or the name of a sports drink popular among a targeted demographic. For the general example ad tag "basketball", the social endorsement module 130 may select from social networking system data 115 social networking system users who have joined a social networking system group dedicated to basketball, users who have basketball listed as an interest in their profile, or users who have communicated to other users about basketball. Likewise, for an ad tag that specifically identifies the brand of shoes, the social endorsement module 130 may select users who have posted to a fan page dedicated to the brand of shoes, who have posted a picture of a pair of the shoes, or who have clicked the "like" button in response to another user who posted a message about the shoes. The ad/endorsement module 140 may combine this social endorsement information 135 with the ad 125 into a single image or file, or may deliver the social endorsement information 135 with the ad 125 separately for display within the third-party publisher web page 150 to the Internet user 160. However, many other types of advertisements, ad tags, social networking system information, selecting criteria and combination methods may be used. The examples given are merely demonstrative, and are not meant to limit the scope of the invention.

System Architecture

Figure 2:
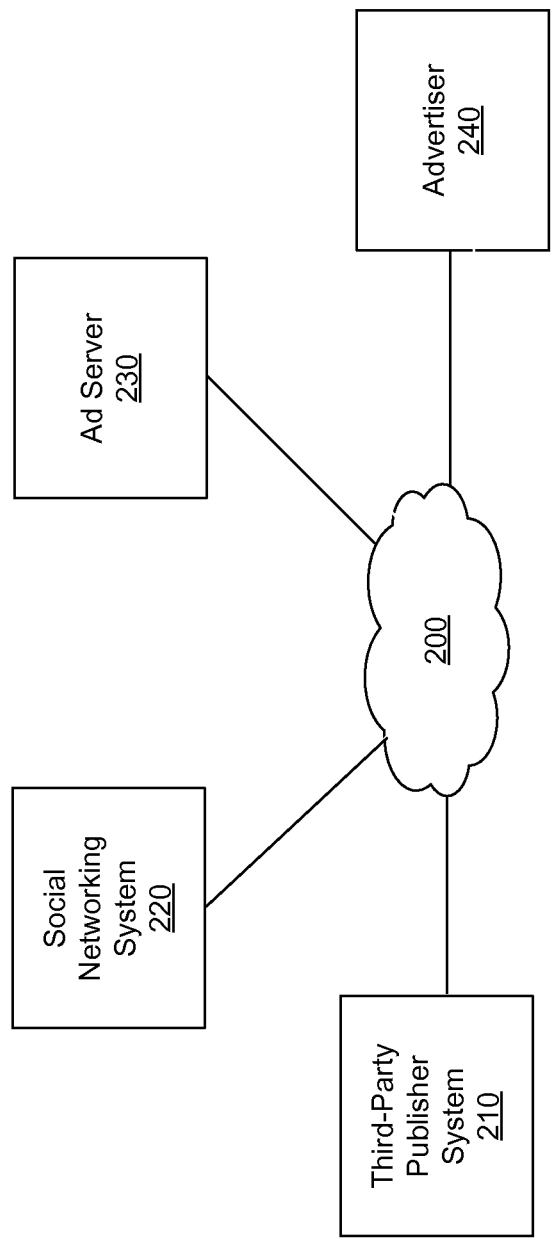
FIG. 2 is a high level block diagram illustrating a system environment suitable for providing social endorsement information with ads for third-party publisher systems, in accordance with one embodiment of the invention.

FIG. 2 is a high level block diagram illustrating a system environment suitable for providing social endorsement information with ads for third-party publisher systems, in accordance with one embodiment of the invention. The system environment comprises a third-party publisher system 210, a social networking system 220, an ad server 230, and an advertiser 240, all of which communicate through a connecting network 200. The connecting network may be the Internet, a local area network, or any other network that allows communication between modules. The connecting network 200 may use standard communications technologies and/or protocols. In alternative configurations, different and/or additional modules can be included in the system.

The third-party publisher system 210 may be a website that can display an advertisement, may comprise one or more web pages, and may be hosted on a web server. Likewise, the system 210 may comprise a computer, a laptop, a netbook, a tablet computer or a mobile device, or any other suitable device which can display an advertisement within a native application running on the device. The ad displayed on the system 210 may comprise text, images, video, audio, or any other ad-related content. The ad may be static, animated, interactive, transparent, mobile, stationary, displayed outside the initial viewing area of a website or application, or in the case of a website, when the website is initially accessed, the ad may constitute its own web page altogether that is displayed when accessing the website.

The system 210 may request an ad from an ad server 230. The system 210 may request an ad before rendering a web page or loading an application, or may render all or part of the web page or load the application before requesting an ad. The system 210 may reserve a space in the body or the margins of the displayed content for the ad, which may be referred to as the ad footprint. The system 210 may reserve the ad footprint before or after receiving the ad, and may or may not adjust the size of the ad footprint if the received ad is a different size than anticipated. Further, the system 210 may reserve additional space for the ad footprint to account for the display of anticipated social endorsement information. In such cases, the system 210 may be responsible for combining the ad and the social endorsement information for display.

The social networking system 220 may comprise a plurality of web pages hosted on one or more web servers. The plurality of web pages may present social networking system information. For example, these pages may include pages for user profiles, group profiles, fan pages, and other social networking system-related pages. These pages may include a variety of social networking system data, such as personal information, user information, user actions, group information, fan page information, endorsement information, content items, user settings, group settings, search results, ads, ad tags, and any other social networking system-related data. The social networking system data is stored in one or more social networking system databases. These databases and all other social networking system components can communicate with the third-party system 210, the ad server 230, the advertiser 240 or any other module through the connecting network 200 via the social networking system web servers. The databases may provide social networking system user data, user actions or any other social networking system data when by requested another module.

The ad server 230 comprises at least one or more web servers coupled to one or more databases. The databases may store a plurality of web-based ads and a plurality of ad tags. The ads may be received from advertiser 240 or any other entity capable of providing web-based ads for delivery by the ad server 230. The ad server's web servers can receive ads for storage and can serve ads from the databases to any module which requests ads. In some instances, the ad server 230 and the advertiser 240 are the same entity. Likewise, in some instances, the ads and associated ad tags may come from different sources. The ad server 230 may serve an ad with an accompanying one or more ad tags, or the ad server 230 may serve an ad without an accompanying ad tag. The ad server 230, in response to receiving a request for an ad, may in turn request an ad from the advertiser 240; likewise, the ad server 230 may request ad tags from the advertiser 240 or any other module.

The advertiser 240 comprises at least one or more web servers coupled to one or more databases. The databases may store web-based ads to be delivered to the ad server 230 or any other module, and may store ad tags for stored ads or any other ad. The advertiser 240 may generate ad tags for an ad prior to serving the ad to the ad server 230 or any other module. Alternatively, the advertiser 240 may generate ad tags after the ad has been served, for instance in response to a request for an ad tag by the ad server 230 or any other module. In various embodiments, there are more or fewer components performing the same or substantially similar functions as the components of the embodiment of FIG. 2.

Operation

Figure 3:
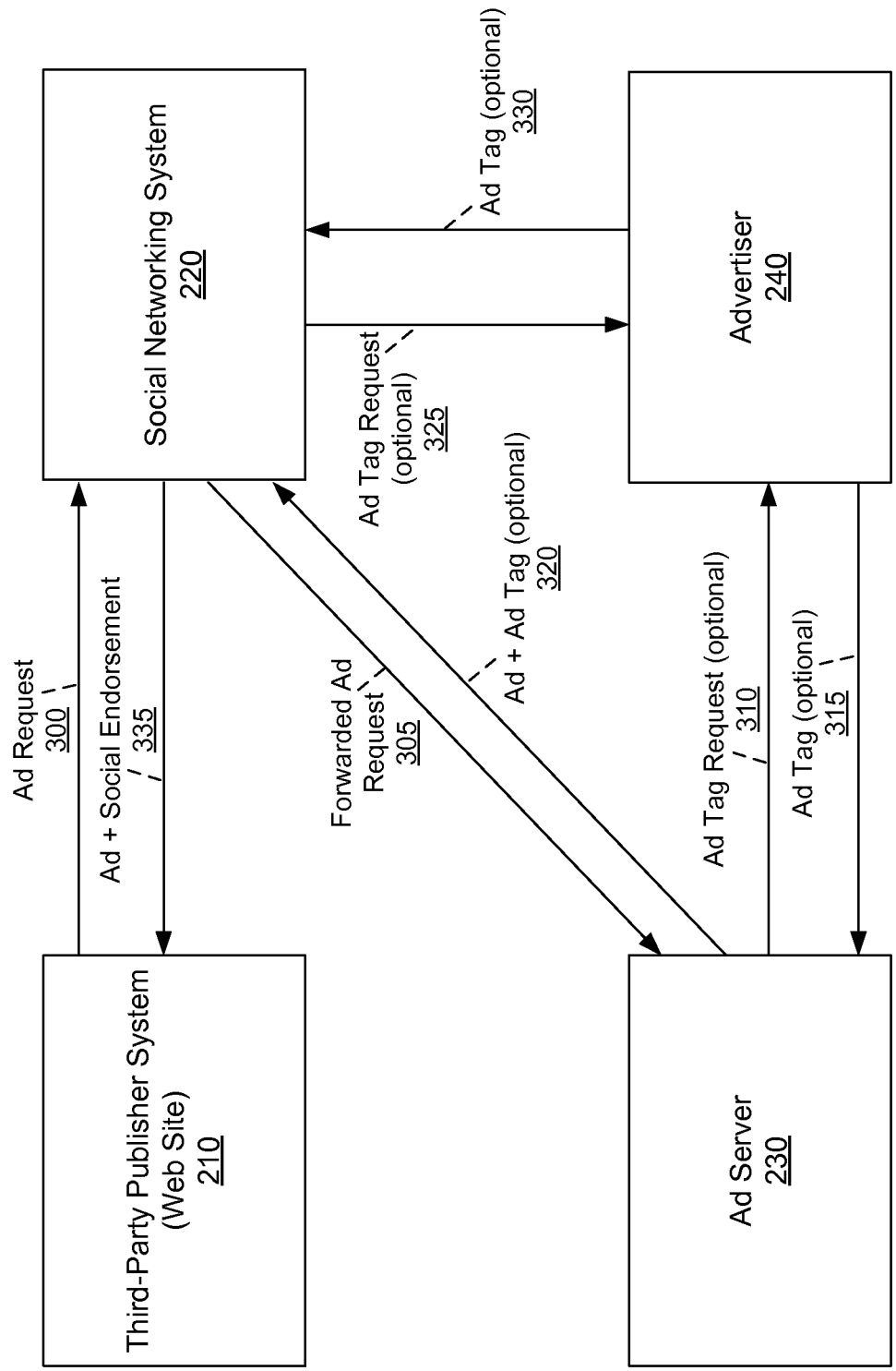
FIG. 3 is a block diagram illustrating one embodiment of the invention in which the ads are provided in a website, and where the social networking system acts as a proxy for communication between a third-party publisher website and the ad server.

FIG. 3 is a block diagram illustrating one embodiment of the invention in which the ads are provided in a website, and where the social networking system acts as a proxy for communication between a third-party publisher website and the ad server. Although this and the following embodiments are discussed in the context of a third-party publishing website, any details discussed herein apply to any third-party publishing system; the examples used here are merely for illustrative purposes. First, in response to an Internet user accessing a third-party publisher website, the website transmits 300 a request for an ad to the social networking system 220. The request may or may not specify a particular ad, a particular category of ad, ad dimensions, ad keywords or any other ad-related information. Similarly, the request may identify the Internet user accessing the website.

The social networking system 220 then forwards 305 the ad request to the ad server 230. The social networking system 220 may modify the ad request to include different or additional information. For instance, the social networking system 220 may alter an ad request's requested ad dimensions to allow the social networking system 220 to include social endorsement information that when combined with the dimensions of the altered ad request is equal to the dimensions of the original ad request. The social networking system 220 may also request ad tags from the ad server, may explicitly request an ad without ad tags, or may ignore or discard any received ad tags.

The ad server 230 forwards 320 an ad to the social networking system in response to the receipt of the ad request. In one embodiment, the ad server selects an ad from the ad server's databases. In an alternative embodiment, the ad server requests an ad from the advertiser 240. If the ad request specifies a particular ad, and the particular ad is not stored in the ad server's databases or is otherwise not available to the ad server 230, the ad server 230 may select or request a different ad. Likewise, if an ad meeting the requirements of requested ad dimensions is not available, the ad server 230 may select an ad with similar dimensions to transmit to the social networking system 220, or may alter an ad's dimensions to comply with the requested ad dimensions prior to transmission to the social networking system. If the ad request specifies an ad category or an ad keyword, the ad server 230 may select an ad for transmission based on the requested category or keyword, or may select an ad with an alternative classification.

In some embodiments, the ad server 230 stores ad tags with associated ads, and transmits one or more associated ad tags with the ad to the social networking system 220. In other embodiments, the ad server generates ad tags based on the content of ads. Optionally, the ad server 230 may request 310 an ad tag from the advertiser 240. In such instances, the ad server 230 may identify the selected ad to the advertiser 240 and the advertiser 240 may transmit 315 ad tags to the ad server 230 based on this identification. Alternatively, the advertiser 240 may generate ad tags in response to receiving a request for ad tags from the ad server 230. In other embodiments, the advertiser 240 forwards ad tags to the ad server 230 prior to the ad server's receipt of a request for an ad from the social networking system 220. In such instances, the advertiser 240 may transmit the ad tags to the ad server 230 at the same time as the advertiser 240 transmits the associated ad, or the advertiser 240 may transmit the ad tags separate from the associated ad.

Once an ad has been selected, the ad server 230 will transmit 320 the selected ad to the social networking system 220. Optionally, the ad server 230 will transmit one or more ad tags in conjunction with the ad. In one embodiment, the ad tags transmitted with the ad are the ad keywords, associated demographics, targeting criteria, or ad categories in the ad request transmitted by the third-party publisher website 210 or the social networking system 220. Upon receipt of the ad from the ad server 230, the social networking system 220 will utilize the ad tags associated with the received ad in order to create social endorsement information. If ad tags are not transmitted from the ad server 230, the social networking system 220 may generate ad tags for the received ad, or may optionally request 325 the ad tags from the advertiser 240. In the event that the social networking system 220 requests ad tags from the advertiser 220, the social networking system 220 may identify the ad to the advertiser 220. In such instances, the advertiser 240 will select or generate ad tags associated with the social networking system's received ad and will transmit the ad tags to the social networking system 220. The social networking system may also utilize the ad keywords or ad categories from the ad request received from the third-party publisher website 210 as ad tags. Alternatively, the social networking system 220 may generate ad tags for a received ad by parsing ad content or ad metadata for keywords or other information capable of being matched to a content item or other object in the social networking system 220. For example, the social networking system 220 may parse the term "ice cream" from the ad. Then using this term as an ad tag, the social networking system 220 may identify social networking system users that have accessed the social networking system fan page for "Baskin-Robbins".

The social networking system 220 will select a subset of the social networking system data related to social networking system users associated with the Internet user based on the received or generated ad tags to create social endorsement information for transmission to the website. In one embodiment, the subset of social networking system data comprises actions that social networking system users have taken within the context of the social networking system 220. For instance, the subset of data may include all social networking system users who have uploaded a photograph to a fan page, who have sent a message to a particular social networking system user, or who have clicked on a link uploaded to the social networking system 220. In one embodiment, this selection comprises selecting social networking system data related to the ad tags. In one embodiment, the ad tag identifies a particular subject matter, such as an object or content item within the social networking system, and the social endorsement information is selected based on one or more actions performed by a social networking system user with respect to the object or content item. For example, if an ad tag specifies a particular video uploaded to the social networking system, users who have watched or commented on the video are candidates for being selected by the social networking system as social endorsement information. Alternatively, an ad tag may specify a particular social networking system group or fan page; social endorsement information may comprise a listing or identification of users who have joined the group or become a fan of the fan page. Social networking system users may be selected as candidates for social endorsement information based on any suitable user action, including communicating, viewing, joining, liking, downloading, or any other suitable type of interaction with a user, group, fan page, or content item within the context of the social networking system. Once the social networking system selects a list of candidate users to potentially be included within the social endorsement information, the social networking system may select particular users to create social endorsement information using any suitable method. In one embodiment, users are selected for social endorsement information based on an affinity or prediction algorithm with the goal of maximizing the likelihood that the viewing user will click on the ad. In another embodiment, users are selected based on the strength of relationship between the users and the viewing user. In addition, users may be selected based on a having viewed a third-party publishing website or accessed a third-party publishing system in the past. In one embodiment, if no candidate users are available to be selected based on the ad tags, the social networking system may use demographic data specified by an advertiser or other entity to select users for social endorsement information.

In some embodiments, a viewing user accessing the third-party publisher system 210 is identified to the social networking system 220. In these cases, social endorsement information may be limited to social networking system users associated with the viewing user. For instance, the social endorsement information may comprise a friend of the viewing user within the context of the social networking system who had recently interacted with a social networking system user, group, fan page or content item related to the ad tags. In one embodiment, the social endorsement information comprises a friend of the viewing user within the context of the social networking system who clicked a "Like" button for a web page within the social networking system identified by an ad tag. In another embodiment, the social endorsement information comprises social networking system users with similar demographic criteria to the viewing user who have interacted with a social networking system user, group, fan page or content item related to the ad tags.

The social networking system 220 then transmits 335 the ad and the social endorsement information to the third-party publisher website. In one embodiment, the social networking system combines the social endorsement information and the ad to form an endorsed ad for transmission to the third-party publisher system 210. This combination to form an endorsed ad may comprise overlaying the social endorsement information on top of the ad, or may comprise juxtaposing the social endorsement information next to the ad. The social networking system 220 may resize the endorsed ad to be compatible with ad dimensions transmitted by the third-party publisher system 210 in the ad request. In an alternative embodiment, the social networking system 220 transmits the ad and social endorsement information to the third-party publisher system 210 individually.

When the third-party publisher website receives the ad and the social endorsement information from the social networking system, the website may display the ad and the social endorsement information to the Internet user. In one embodiment, the ad and social endorsement information are combined by the social networking system 220 to form an endorsed ad, which is compatible with the dimensions of the ad footprint reserved by the third-party publisher system 210. In one embodiment, the endorsed ad is not compatible with the dimensions of the reserved ad footprint, and the third-party publisher system 210 resizes the endorsed ad to be compatible with the ad footprint. In an alternative embodiment, the third-party publisher system 210 resizes the ad footprint in order to be compatible with the dimensions of the endorsed ad. This may involve shifting, altering or removing content in order to accommodate the resized ad footprint. In one embodiment, the third-party publisher system 210 receives the ad and the social endorsement information individually and combines the ad and social endorsement information to form an endorsed ad. In one embodiment, the ad and the social endorsement information are displayed separately. It should be noted that the features and limitations of the embodiments discussed in conjunction with FIG. 3 apply to the embodiments discussed in the remainder of this application.

Figure 4:
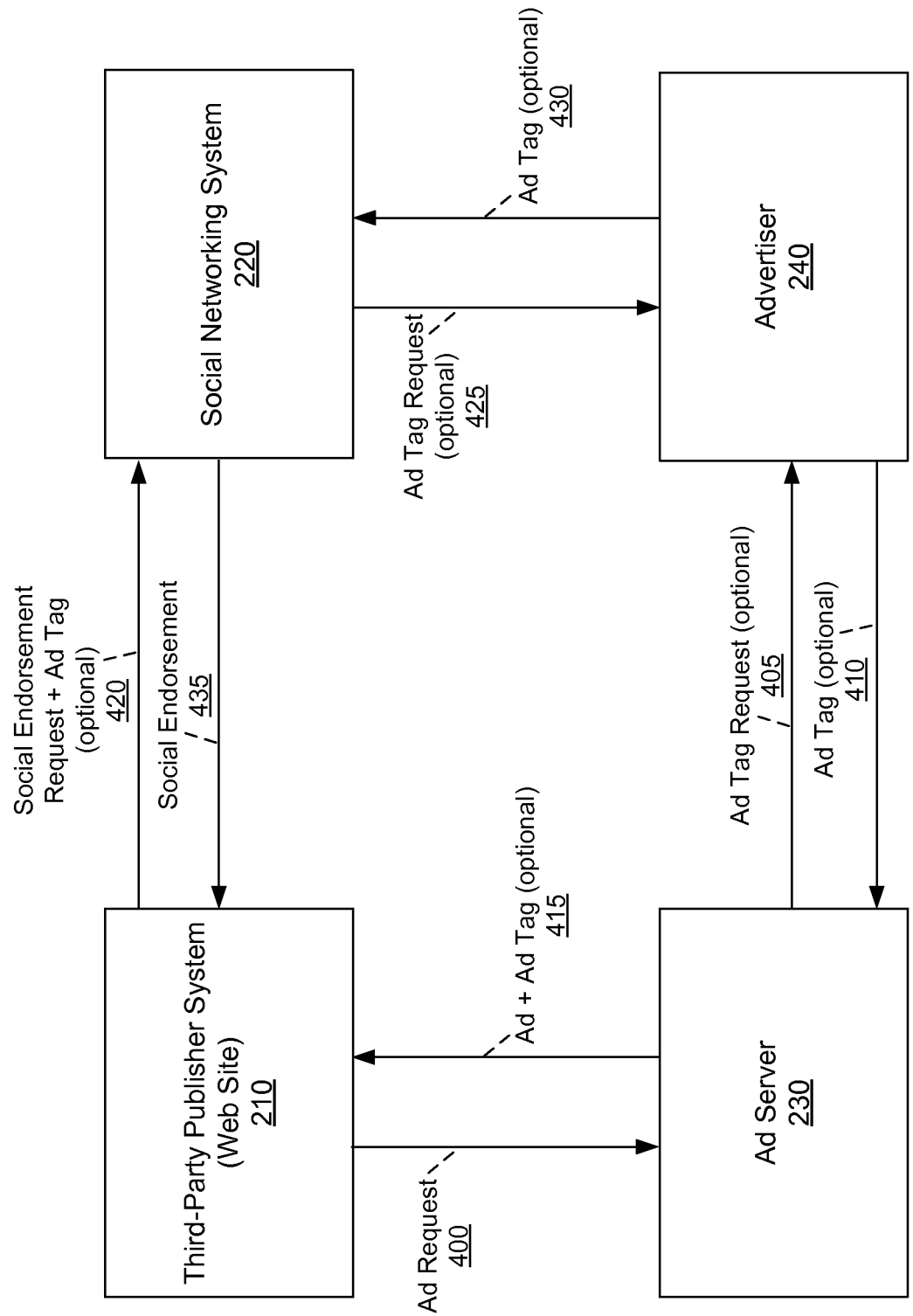
FIG. 4 is a block diagram illustrating one embodiment of the invention in which the ads are provided in a website, and where a third-party publisher website communicates directly with the ad server and the social networking system, which transmits social endorsement information to the third-party publisher website.

FIG. 4 is a block diagram illustrating one embodiment of the invention in which the ads are provided in a website, and where a third-party publisher website communicates directly with the ad server and the social networking system, which transmits social endorsement information to the third-party publisher website. First, the third-party publisher website sends 400 an ad request directly to the ad server 230. The ad server 230 may optionally request 405 and receive 410 ad tags from the advertiser 240. The ad server 230 then transmits 415 the ad to the third-party publisher website. If the ad server 230 receives ad tags from the advertiser, or has ad tags stored in the ad server databases, the ad server 230 may optionally transmit ad tags to the website. The website then requests social endorsement information from the social networking system 220. The website may optionally transmit ad tags to the social networking system 220 if ad tags were received from the ad server 230. Alternatively, the social networking system 220 may request 425 and receive 430 ad tags from the advertiser 240. Once the social networking system 240 receives ad tags, the social networking system 220 creates social endorsement information and transmits 435 the social endorsement information to the third-party publisher website for display.

Figure 5:
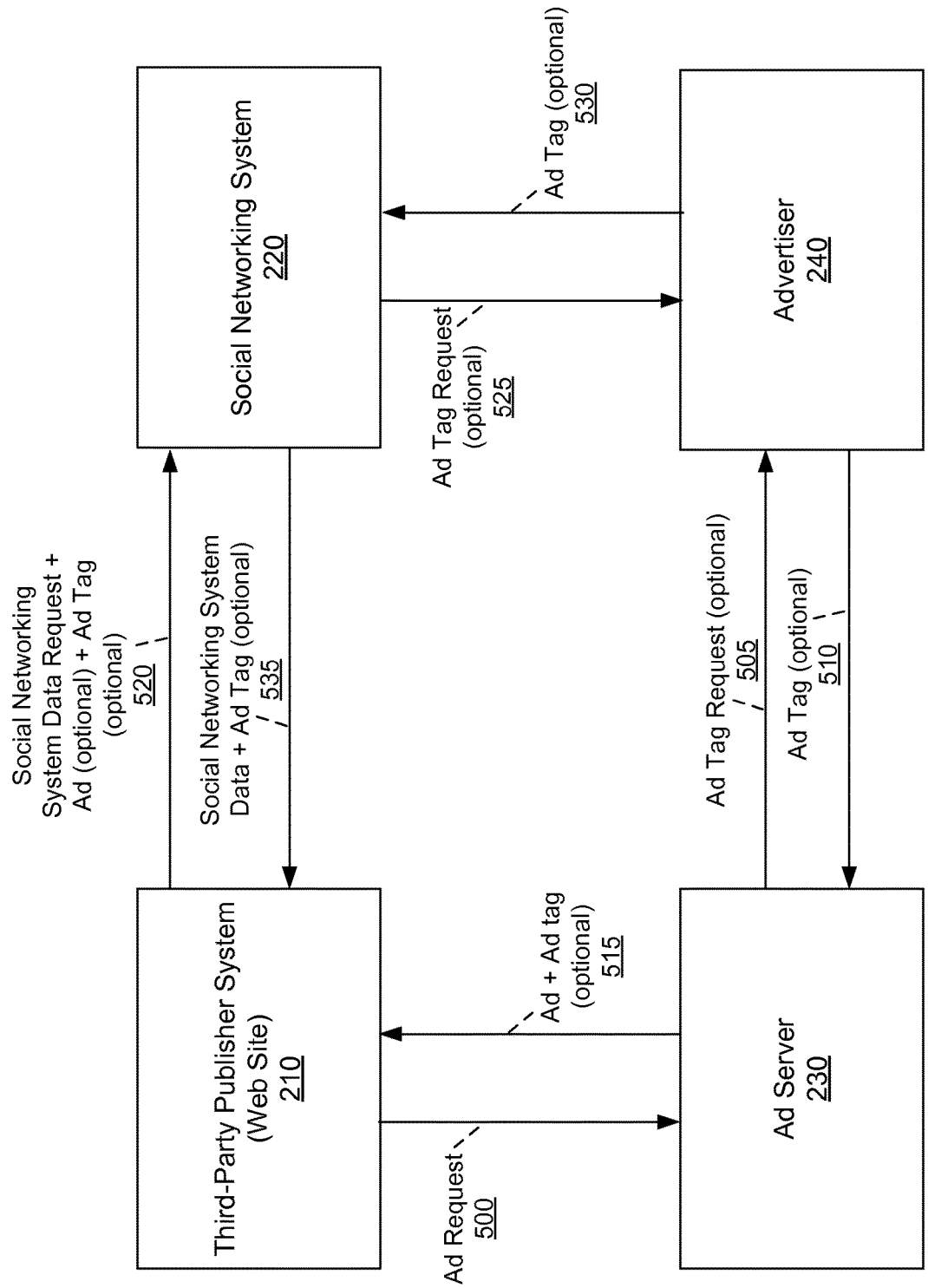
FIG. 5 is a block diagram illustrating one embodiment of the invention in which the ads are provided in a website, and where a third-party publisher website communicates directly with the ad server and the social networking system, which transmits social networking system data to the third-party publisher website to create social endorsement information.

FIG. 5 is a block diagram illustrating one embodiment of the invention in which the ads are provided in a website, and where a third-party publisher website communicates directly with the ad server and the social networking system, which transmits social networking system data to the third-party publisher website to create social endorsement information. The third-party publisher website requests 500 and receives 515 an ad from the ad server 230 and requests 520 social networking system data from the social networking system 220. The ad server 230 may optionally request 505 and receive 510 ad tags from the advertiser 240. The website identifies the received ad to the social networking system 220, and the social networking system 220 transmits 535 social networking system data to the website in response. In one embodiment, identifying the received ad comprises transmitting the ad to the social networking system 220 in order for the social networking system 220 to identify the ad. In another embodiment, identifying the received ad comprises transmitting received ad tags to the social networking system 220. The ad server 230 may identify the ad to the social networking system 220 utilizing any suitable means necessary for the social networking system 220 to select social networking system data to create social endorsement information. In one embodiment, the social networking system 220 only transmits a subset of social networking system data to the third-party publisher system 210. This subset of social networking system data may be selected based on the ad identified by the third-party publisher system 210. The social networking system 220 may request 525 and receive 530 ad tags, which may optionally be transmitted to the third-party publisher system 210. When the third-party publisher system 210 has received the ad, the social networking system data and the ad tags, the third-party publisher system 210 creates social endorsement information by selecting social networking system data based on the received ad tags. In one embodiment, the ad is then displayed with the social endorsement information.

Figure 6:
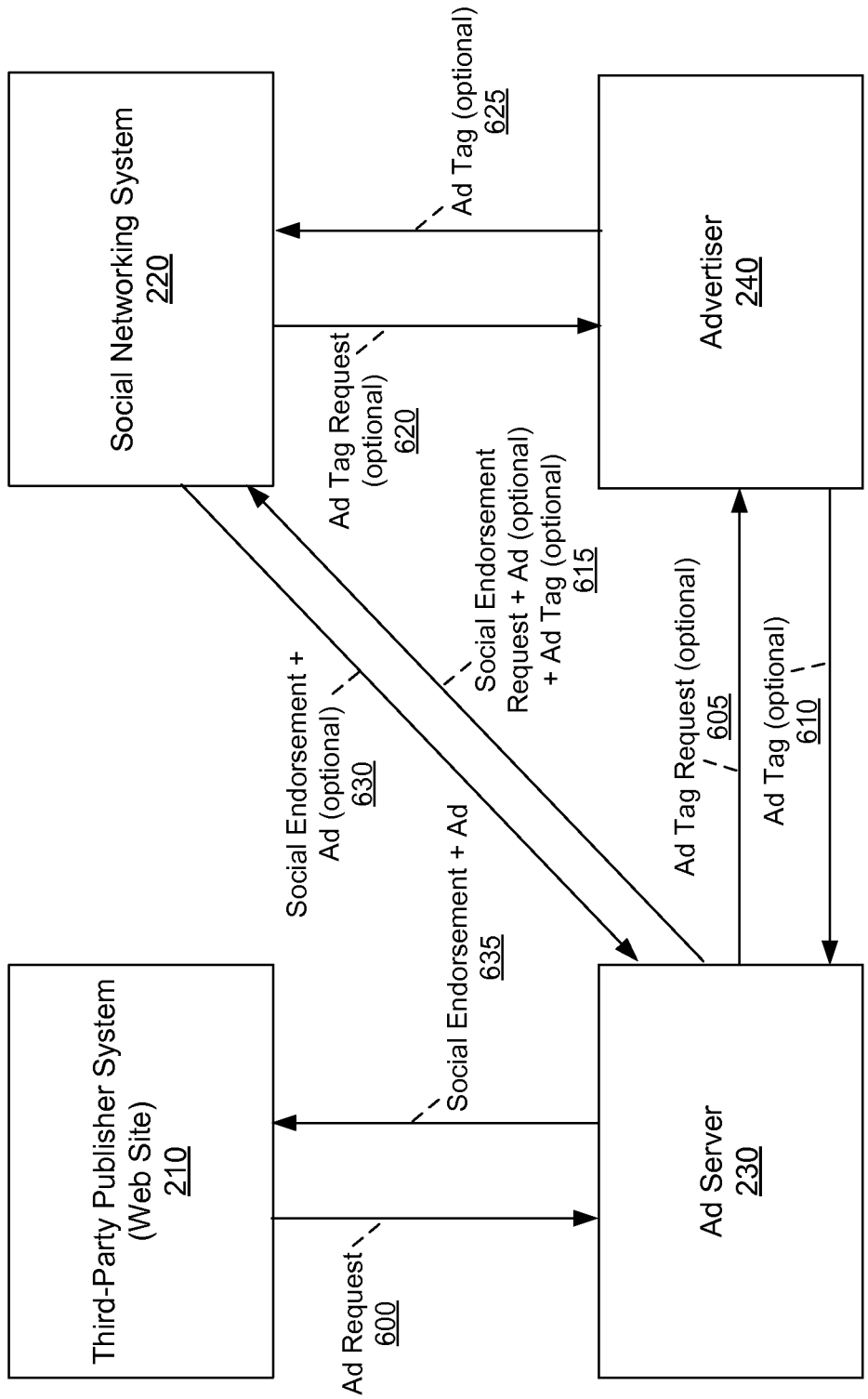
FIG. 6 is a block diagram illustrating one embodiment of the invention in which the ads are provided in a website, and where the ad server acts as a proxy for communication between a third-party publisher website and the social networking system.

FIG. 6 is a block diagram illustrating one embodiment of the invention in which the ads are provided in a website, and where the ad server acts as a proxy for communication between a third-party publisher website and the social networking system. The third-party publisher website requests 600 an ad from the ad server 230. Responsive to this, the ad server 230 selects an ad and requests 615 social endorsement information from the social networking system 220. In one embodiment, the ad server 230 selects an ad prior to requesting 615 social endorsement information from the social networking system 220. In this embodiment, the ad server 230 identifies the ad to the social networking system 220. This identification may comprise transmitting the ad to the social networking system 220, transmitting ad tags to the social networking system 220, or any other suitable method of identification. The ad server 230 may optionally request 605 and receive 610 ad tags from the advertiser 240. In an alternative embodiment, the ad server 230 requests 615 social endorsement information prior to selecting an ad. In this embodiment, the ad server 230 may identify the ad category or ad keywords transmitted in the ad request from the third-party publisher system 210 in the request for social endorsement information from the social networking system 220. Likewise, the ad server 230 may transmit ad tags to the social networking system 220. Any suitable information that the social networking system 220 can use to select social networking system date to create social endorsement information may be transmitted from the ad server 230 to the social networking system 220.

In one embodiment, the social networking system 220 may optionally request 620 and receive 625 ad tags from the advertiser 240. The social networking system 220 then selects social networking system data to create social endorsement information based on the ad received from the ad server 230, the ad tags received from the ad server 230 or the advertiser 240, ad tags generated by the social networking system 220, or any other identifying information received from the ad server 230. If the social networking system 220 received the ad from the ad server 230, the social networking system 220 may combine the social endorsement information and the ad to create an endorsed ad, which is then transmitted 630 to the ad server 230. Alternatively, the social networking system 220 may transmit 630 only the social endorsement information to the ad server 230. The ad server 230 then transmits 635 the social endorsement information and the ad to the third-party publisher system210. In one embodiment, the ad server 230 combines the social endorsement information and the ad to create an endorsed ad prior to transmission to the website 210.

Figure 7:
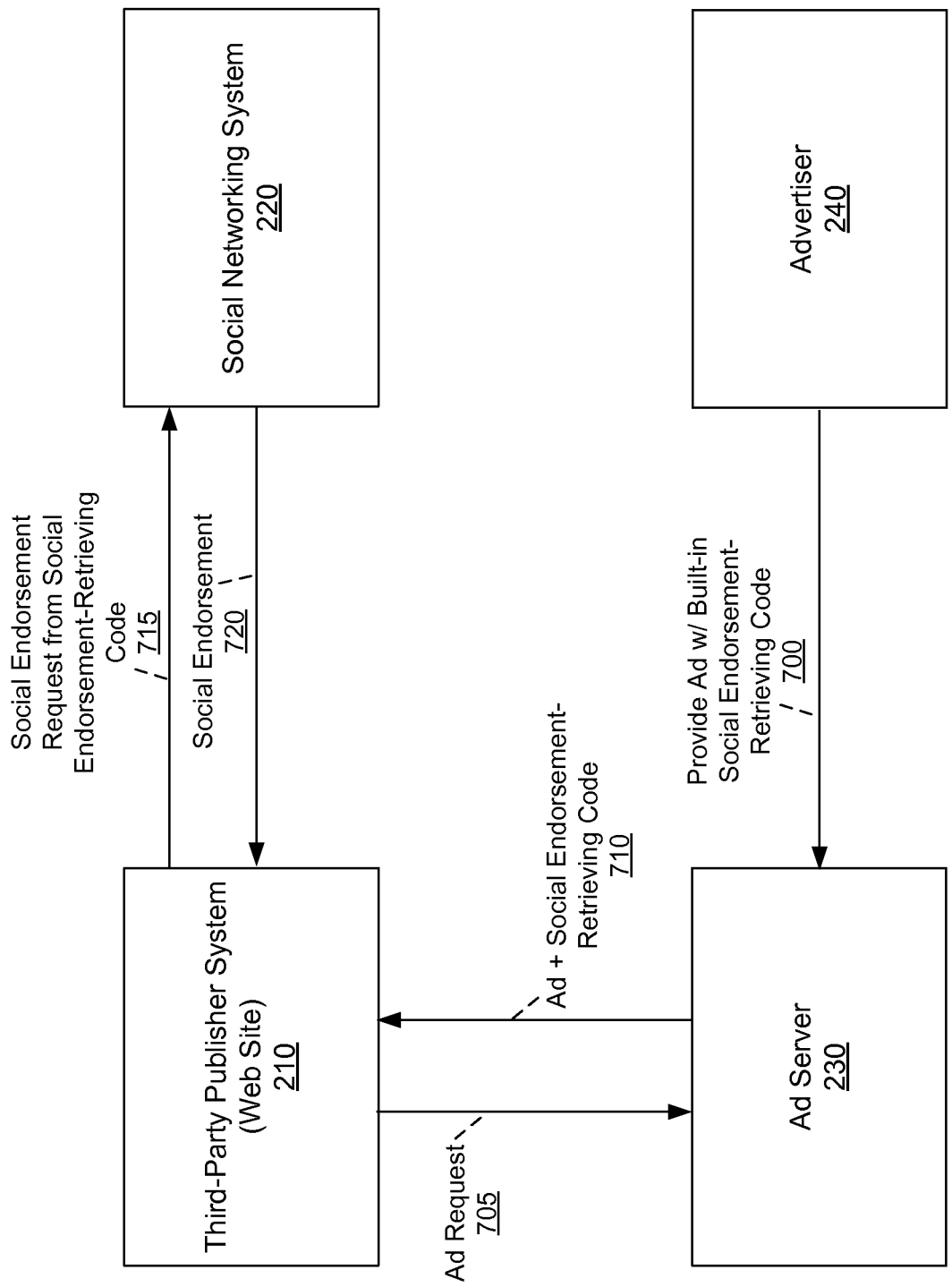
FIG. 7 is a block diagram illustrating one embodiment of the invention in which the ads are provided in a website, and where the advertiser builds code into an advertisement that obtains social endorsement information when executed.

FIG. 7 is a block diagram illustrating one embodiment of the invention in which the ads are provided in a website, and where the advertiser builds code into an advertisement that obtains social endorsement information when executed. First, an advertiser 240 provides 700 an ad to the ad server 230 that contains computer-executable code that when executed, retrieves social endorsement information. The code may require a third-party publisher website to specifically execute the code in order for the code to retrieve social endorsement information, or the code may execute automatically upon display of the ad on the website. Likewise, the website may choose not to execute the code, and may instead seek social endorsement information independently. The code may be written in HTML, Java, Flash, XML, or any other suitable computer language. The code may contain information that identifies the ad, may contain ad tags, or may contain any other information that the social networking system 220 can utilize to select social networking system data to create social endorsement information. The code may identify the viewing user to the social networking system 220. In one embodiment, the code may transmit the ad to the social networking system 220. In one embodiment, the code may specify the dimensions of the ad, the required dimensions of the social endorsement information, or any other characteristic of the ad, the third-party publisher system 210, or the viewing user.

The third-party publisher website requests 705 and receives 710 an ad from the ad server 230. In one embodiment, the third-party publisher system 210 specifically requests an ad with built-in social endorsement information-retrieving code. Alternatively, the third-party publisher system 210 may not specifically request an ad with social endorsement information-retrieving code built in, but may still receive such an ad. The third-party publisher system 210 then executes the code, which requests 715 social endorsement information from the social networking system 220. The social networking system 220 then creates and transmits 720 the social endorsement information to the third-party publisher system 210 for display in conjunction with the ad.

Figure 8:
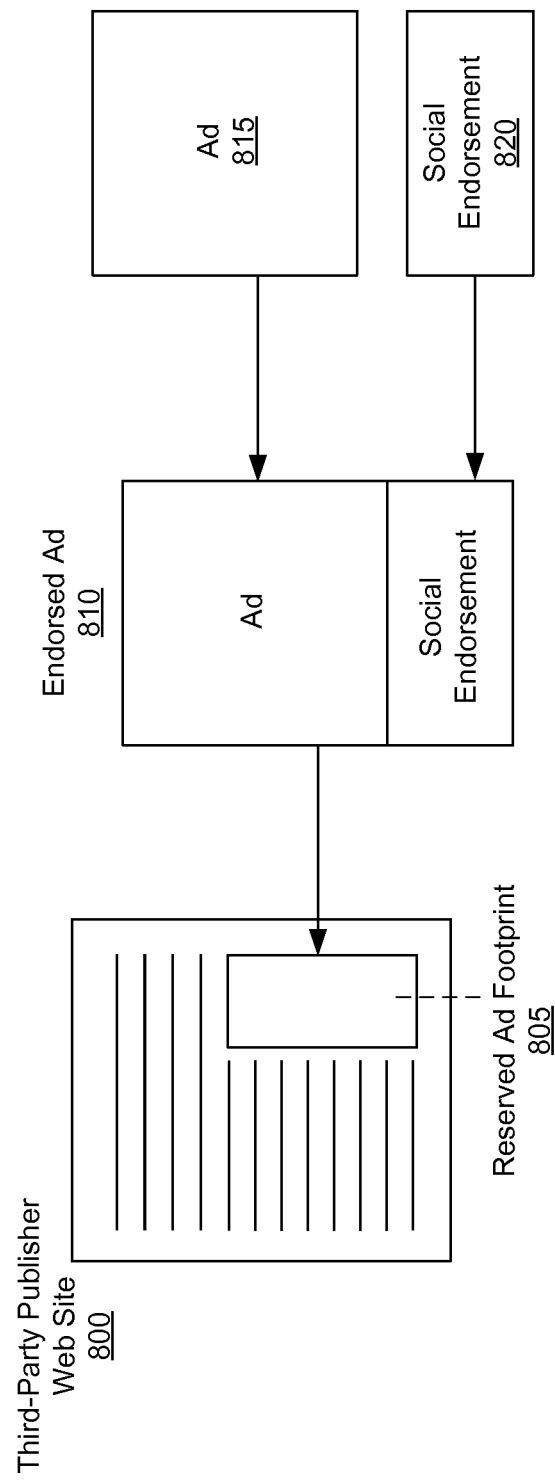
FIG. 8 is a diagram illustrating the combination of an ad and social endorsement information to create an endorsed ad transmitted to a third-party publisher website, wherein the footprint of the endorsed ad is equivalent to the reserved ad footprint of the third-party publisher website, in accordance with one embodiment of the invention in which the ads are provided in a website.

FIG. 8 is a diagram illustrating the combination of an ad and social endorsement information to create an endorsed ad transmitted to a third-party publisher website, wherein the footprint of the endorsed ad is equivalent to the reserved ad footprint of the third-party publisher website, in accordance with one embodiment of the invention in which the ads are provided in a website. In this embodiment, the website 800 reserves a space on a web page for an ad, the ad footprint 805. An entity other than the website 800 receives an ad 815 and social endorsement information 820, and combines them to create an endorsed ad 810. In this embodiment, the combination of the ad 815 and social endorsement information 820 comprises juxtaposing the social endorsement information 820 below the ad 815. For example, if the ad 815 and the social endorsement information 820 were both images, the endorsed ad 810 would be an image with the combined dimensions of the ad 815 and the social endorsement information 820. In this embodiment, the dimensions of the endorsed ad are equivalent or substantially similar to the dimensions of the ad footprint 805. The endorsed ad 810 is then transmitted to the website 800 for display within the ad footprint 805.

Figure 9:
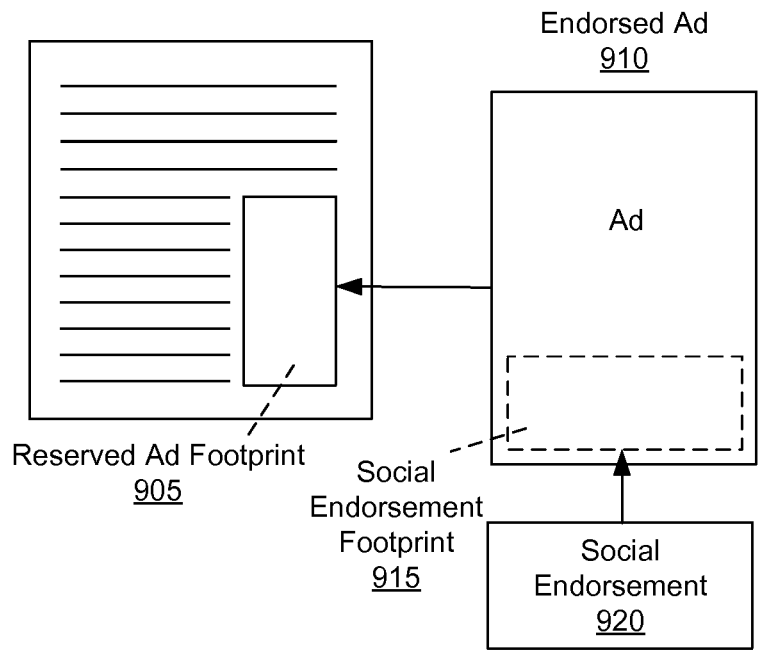
FIG. 9 is a diagram illustrating the combination of an ad and social endorsement information into an endorsed ad transmitted to a third-party publisher website, wherein the footprint of the endorsed ad is equivalent to the reserved ad footprint of the third-party publisher website, in accordance with one embodiment of the invention in which the ads are provided in a website.

FIG. 9 is a diagram illustrating the combination of an ad and social endorsement information into an endorsed ad transmitted to a third-party publisher website, wherein the footprint of the endorsed ad is equivalent to the reserved ad footprint of the third-party publisher website, in accordance with one embodiment of the invention in which the ads are provided in a website. In this embodiment, the third-party publisher website 900 reserves a space on a web page for an ad, the ad footprint 905. The entity that provides the ad to the website 900 selects an ad, and reserves a space within the ad for social endorsement information, the social endorsement information footprint 915. The entity that provides the ad receives social endorsement information 920, combines the ad and social endorsement information 920 by overlaying the social endorsement information 920 over the ad's reserved social endorsement footprint 915 to create an endorsed ad 910. In this embodiment, the dimensions of the endorsed ad 910 are equivalent or substantially similar to the dimensions of the ad footprint 905. The endorsed ad 910 is then transmitted to the website 900 for display within the ad footprint 905.

Figure 10:
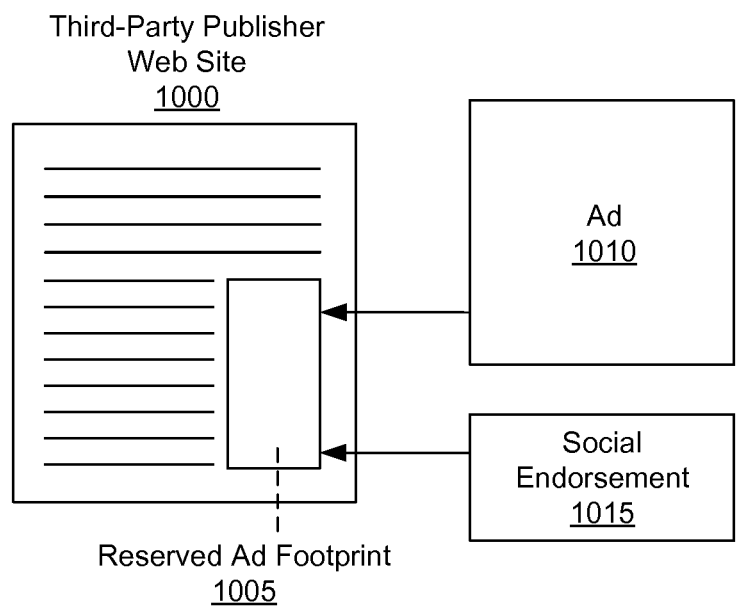
FIG. 10 is a diagram illustrating the separate transmission of an ad and social endorsement information to a third-party publisher website, in accordance with one embodiment of the invention in which the ads are provided in a website.

FIG. 10 is a diagram illustrating the separate transmission of an ad and social endorsement information to a third-party publisher website, in accordance with one embodiment of the invention in which the ads are provided in a website. In this embodiment, the third-party publisher website 1000 reserves a space on a web page for an ad, the ad footprint 1005. The website 1000 receives the ad 1010 and the social endorsement information 1015 individually, and combines them for display within the ad footprint 1005. In this embodiment, the combination of the ad 1010 and the social endorsement information 1015 results in the display of the ad 1010 and the social endorsement information 1015 within the dimensions of the ad footprint 1005.

Figure 11:
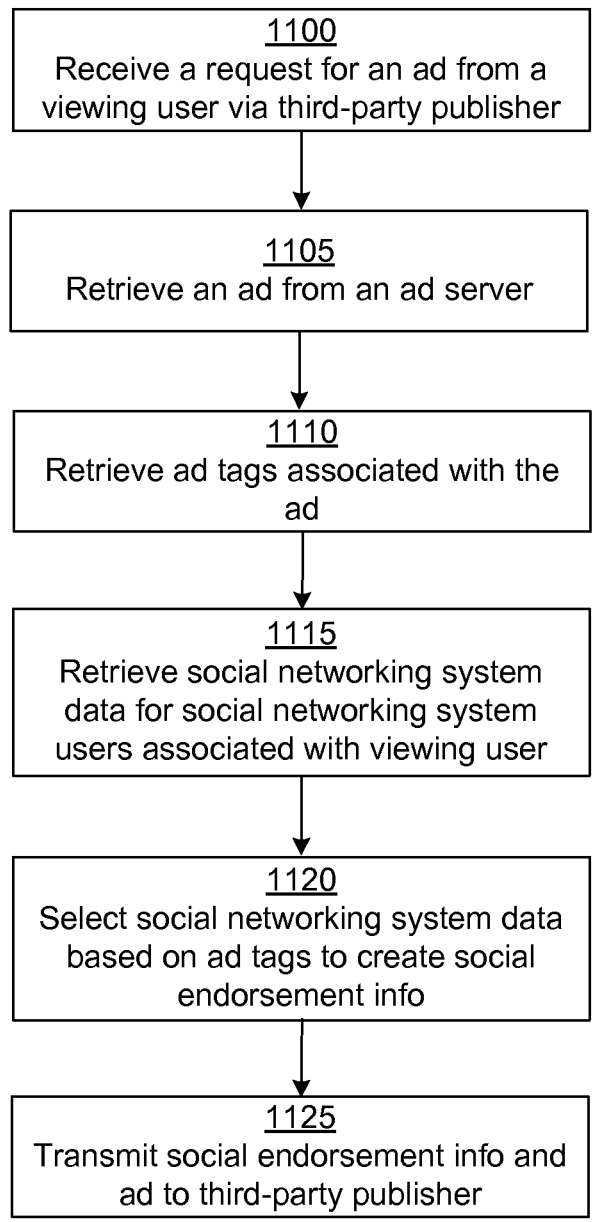
FIG. 11 is a flow chart of the process for providing social endorsement information with an ad to a third-party publisher system, in accordance with one embodiment of the invention.

FIG. 11 is a flow chart of the process for providing social endorsement information with an ad to a third-party publisher system, in accordance with one embodiment of the invention. First, a request for an ad is received 1100 from an viewing user via a third-party publisher system. Next, an ad is retrieved 1105 from an ad server. Ad tags associated with the ad are then retrieved 1110. Social networking system data is retrieved 1115 from a social networking system for social networking system users associated with the viewing user. Next, social endorsement information is created 1120 by selecting social networking system data based on the ad tags. Finally, the social endorsement information and ad are transmitted 1125 to the third-party publisher system.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving a request for an advertisement at an advertisement server from a third-party publisher system in response to a request for content from a viewing user of the third-party publisher system, the advertisement server communicatively coupled to a social networking system that is independent from the third-party publisher system, the advertisement server acting as a proxy for communication between the third-party publisher system and the social networking system, the viewing user having previously established a connection with one or more additional users of the social networking system;
   parsing at least one of content of the advertisement and metadata describing the advertisement to identify one or more keywords capable of being matched to one or more content items within the social networking system;
   matching each of the one or more keywords to one or more content items within the social networking system;
   generating, by the advertisement server, one or more advertisement tags associated with the advertisement, wherein an advertisement tag is a URL that specifies a web page associated with an object in the social networking system, the object associated with one or more of the matched content items;
   accessing, by the advertisement server, social networking system data from the social networking system related to the one or more additional users connected to the viewing user and related to the advertisement tags;
   creating, by the advertisement server, a social endorsement based on the accessed social networking system data, the social endorsement indicating that one or more of the additional users have taken an action with respect to an object of the social networking system, the object related to the one or more advertisement tags, wherein the social endorsement is determined for the advertisement based on the one or more additional users and social networking system data related to the advertisement tags;
   combining the social endorsement with the advertisement into a combined advertisement; and
   sending, by the advertisement server, the combined advertisement for display to the viewing user at the third-party publisher system.

2. The computer-implemented method of claim 1, wherein combining the social endorsement with the advertisement comprises overlaying the social endorsement on the advertisement.

3. The computer-implemented method of claim 2, wherein the social endorsement is overlaid based on an instruction for an area of the advertisement on which to overlay the social endorsement.

4. The computer-implemented method of claim 2, wherein the social endorsement is overlaid based on an algorithm for determining an area of the advertisement on which to overlay the social endorsement.

5. The computer-implemented method of claim 1, wherein the third-party publisher system comprises a website.

6. The computer-implemented method of claim 1, wherein the third-party publisher system comprises a software application.

7. The computer-implemented method of claim 1, wherein the advertisement server selects the advertisement in response to receiving the request for the advertisement, and provides the advertisement to the social networking system.

8. The computer-implemented method of claim 7, wherein the advertisement server provides the selected advertisement to the social networking system before the step of the advertisement server accessing the social networking system data.

9. The computer-implemented method of claim 1, wherein the social endorsement comprises an indication that one or more users of the social networking system with whom the viewing user has established a connection in the social networking system have interacted with the web page specified by the advertisement tags.

10. The computer-implemented method of claim 1, wherein one or more of the advertisement tags identify a content item in the social networking system with which users of the social networking system can interact.

11. The computer-implemented method of claim 1, wherein creating the social endorsement comprises selecting one or more other social networking system users based on matching demographic criteria specified by an advertiser, the social endorsement based on accessed social networking system data associated with the selected one or more other social networking system users.

12. The computer-implemented method of claim 1, wherein creating the social endorsement comprises selecting one or more other social networking system users based on matching demographic criteria specified by the third-party publisher system, the social endorsement based on accessed social networking system data associated with the selected one or more other social networking system users.

13. The computer-implemented method of claim 1, wherein the third-party publisher system is configured to determine identifying information associated with the viewing user, wherein the received request includes the identifying information, and further comprising:
receiving, by the advertisement server from the third-party publisher system, the identifying information, wherein the advertisement server is configured to provide the identifying information to the social networking system, and wherein the social networking system is configured to identify a user account of the viewing user based on the identifying information.

14. The computer-implemented method of claim 13, wherein the user account of the viewing user is not shared with the third-party publisher system.

15. The computer-implemented method of claim 13, wherein the user account of the viewing user is not shared with the advertisement server.

16. A non-transitory computer-readable storage medium storing instructions configured to, in response to execution by a processor of an advertisement server, cause the advertisement server to:
receive a request for an advertisement from a third-party publisher system in response to a request for content from a viewing user of the third-party publisher system, the advertisement server communicatively coupled to a social networking system that is independent from the third party publisher system, the advertisement server acting as a proxy for communication between the third-party publisher system and the social networking system, the viewing user having previously established a connection with one or more additional users of the social networking system;
parse at least one of content of the advertisement and metadata describing the advertisement to identify one or more keywords capable of being matched to one or more content items within the social networking system;
match each of the one or more keywords to one or more content items within the social networking system;
generate, by the advertisement server, one or more advertisement tags associated with the advertisement, wherein an advertisement tag is a URL that specifies a web page associated with an object in the social networking system, the object associated with one or more of the matched content items;
access social networking system data from the social networking system related to the one or more additional users connected to the viewing user and related to the advertisement tags;
create a social endorsement based on the accessed social networking system data, the social endorsement indicating that one or more of the additional users have taken an action with respect to an object of the social networking system, the object related to the one or more advertisement tags, wherein the social endorsement is determined for the advertisement based on the one or more additional users and social networking system data related to the advertisement tags;
combine the social endorsement with the advertisement into a combined advertisement; and
send the combined advertisement for display to the viewing user at the third-party publisher system.

17. An advertisement server comprising:
a processor; and
a memory storing instructions that, when executed by the processor, cause the advertisement server to:
receive a request for an advertisement from a third-party publisher system in response to a request for content from a viewing user of the third-party publisher system, the advertisement server communicatively coupled to a social networking system that is independent from the third party publisher system, the advertisement server acting as a proxy for communication between the third-party publisher system and the social networking system, the viewing user having previously established a connection with one or more additional users of the social networking system;
parse at least one of content of the advertisement and metadata describing the advertisement to identify one or more keywords capable of being matched to one or more content items within the social networking system;
match each of the one or more keywords to one or more content items within the social networking system;
generate, by the advertisement server, one or more advertisement tags associated with the advertisement, wherein an advertisement tag is a URL that specifies a web page associated with an object in the social networking system, the object associated with one or more of the matched content items;
access social networking system data from the social networking system related to the one or more additional users connected to the viewing user and related to the advertisement tags;
create a social endorsement based on the accessed social networking system data, the social endorsement indicating that one or more of the additional users have taken an action with respect to an object of the social networking system, the object related to the one or more advertisement tags, wherein the social endorsement is determined for the advertisement based on the one or more additional users and social networking system data related to the advertisement tags;

combine the social endorsement with the advertisement into a combined advertisement; and send the combined advertisement for display to the viewing user at the third-party publisher system.

* * * * *